US011374695B2

(12) United States Patent
Matsumura et al.

(10) Patent No.: US 11,374,695 B2
(45) Date of Patent: Jun. 28, 2022

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 88 days.

(21) Appl. No.: 16/645,389

(22) PCT Filed: Sep. 8, 2017

(86) PCT No.: PCT/JP2017/032585
§ 371 (c)(1),
(2) Date: Mar. 6, 2020

(87) PCT Pub. No.: WO2019/049346
PCT Pub. Date: Mar. 14, 2019

(65) Prior Publication Data
US 2020/0295880 A1    Sep. 17, 2020

(51) Int. Cl.
*H04L 1/18* (2006.01)
*H04L 5/00* (2006.01)
(Continued)

(52) U.S. Cl.
CPC .......... *H04L 1/1812* (2013.01); *H04L 5/0055* (2013.01); *H04L 27/2607* (2013.01); *H04W 72/042* (2013.01); *H04W 72/0413* (2013.01)

(58) Field of Classification Search
CPC . H04L 1/1812; H04L 5/0055; H04L 27/2607; H04L 27/2602; H04L 1/0073;
(Continued)

(56) References Cited

U.S. PATENT DOCUMENTS 9,065,649 B2 *  6/2015  Kim .................... H04L 5/0048
9,451,599 B2 *  9/2016  Cheng ................. H04L 1/0073
(Continued)

FOREIGN PATENT DOCUMENTS

JP    2011-511591 A    4/2011
JP    2012-239209 A    12/2012
WO   2017/119931 A1    7/2017

OTHER PUBLICATIONS

Extended European Search Report issued in Application No. 17924566.7, dated Mar. 26, 2021 (8 pages).
3GPP TSG RAN WG1 NR Ad-Hoc#2; R1-1711098; "Sequence-based PUCCH for UCI of up to 2 bits;" NTT DOCOMO, Inc.; Jun. 27-30, 2017; Qingdao, P.R. China (14 pages).
(Continued)

*Primary Examiner* — Hanh N Nguyen
(74) *Attorney, Agent, or Firm* — Osha Bergman Watanabe & Burton LLP

(57) ABSTRACT

A terminal is disclosed including a transmitter that transmits a Hybrid Automatic Repeat reQuest-Acknowledgement (HARQ-ACK) on an uplink control channel; and a processor that determines a cyclic shift used in transmission of the HARQ-ACK, wherein: if the HARQ-ACK is a 1-bit NACK, the cyclic shift is calculated based on an index and if the HARQ-ACK is a 1-bit ACK, the cyclic shift is calculated based on a sum of the index and a number value, the number value being equal to 6. In other aspects, a radio communication method and a base station are also disclosed.

4 Claims, 13 Drawing Sheets

(51) Int. Cl.
  *H04L 27/26* (2006.01)
  *H04W 72/04* (2009.01)
(58) Field of Classification Search
  CPC ..... H04L 5/023; H04L 5/0007; H04L 5/0082; H04L 1/1861; H04L 27/2613; H04J 13/0074; H04J 13/22; H04W 72/0413; H04W 72/042
  See application file for complete search history.

(56) References Cited

U.S. PATENT DOCUMENTS

| | | | |
|---|---|---|---|
| 2009/0232067 A1 | 9/2009 | Pajukoski et al. | |
| 2015/0358107 A1 | 12/2015 | Papasakellariou et al. | |
| 2018/0367278 A1 | 12/2018 | Chatterjee et al. | |
| 2019/0007175 A1* | 1/2019 | Kwak | H04L 5/0053 |
| 2020/0127795 A1* | 4/2020 | Matsumura | H04L 1/1812 |
| 2020/0170005 A1* | 5/2020 | Matsumura | H04W 72/0413 |

OTHER PUBLICATIONS

3GPP TSG RAN WG1 Meeting #88; R1-1702811; "DMRS-based vs. Sequence-based PUCCH in short duration;" NTT DOCOMO, Inc.; Feb. 13-17, 2017; Athens, Greece (9 pages).
International Search Report issued in PCT/JP2017/032585 dated Nov. 21, 2017 (1 page).
Written Opinion of the International Searching Authority issued in PCT/JP2017/032585 dated Nov. 21, 2017 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in the counterpart Japanese Patent Application No. 2019-540266, dated Nov. 24, 2021 (6 pages).
InterDigital; "Remaining issues on sPUCCH format"; 3GPP TSG RAN WG1 Meeting #90, R1-1714346; Prague, Czech Republic; Aug. 21-25, 2017 (4 pages).

* cited by examiner

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and low latency, Long Term Evolution (LTE) has been specified (Non-Patent Literature 1). Furthermore, for the purpose of wider bands and a higher speed than LTE (also referred to as LTE Rel. 8 or 9), LTE-Advanced (LTE-A that is also referred to as LTE Rel. 10, 11 or 12) has been specified, and LTE successor systems (also referred to as, for example, Future Radio Access (FRA), the 5th generation mobile communication system (5G), 5G+(plus), New Radio (NR), New radio access (NX), Future generation radio access (FX) or LTE Rel. 13, 14, 15 or subsequent releases) have been also studied.

Legacy LTE systems (e.g., LTE Rel. 8 to 13) use a subframe (also referred to as a Transmission Time Interval (TTI)) of one ms to perform communication on DownLink (DL) and/or UpLink (UL). The subframe is a transmission time unit of one channel-coded data packet, and is a processing unit of scheduling, link adaptation, and retransmission control (HARQ: Hybrid Automatic Repeat reQuest).

Furthermore, in the legacy LTE systems (e.g., LTE Rel. 8 to 13), a user terminal (UE: User Equipment) uses a UL control channel (e.g., Physical Uplink Control Channel (PUCCH)) and/or a UL data channel (e.g., a Physical Uplink Shared Channel (PUSCH)) to transmit Uplink Control Information (UCI). A configuration (format) of the UL control channel is also referred to as a PUCCH format.

UCI includes at least one of a Scheduling Request (SR), retransmission control information (also referred to as Hybrid Automatic Repeat reQuest-Acknowledge (HARQ-ACK) or ACK/NACK (Negative ACK)) for DL data (DL data channel (PDSCH: Physical Downlink Shared Channel)), and Channel State Information (CSI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

Future radio communication systems (e.g., 5G and NR) are expected to realize various radio communication services while satisfying respectively different request conditions (e.g., an ultra high speed, a large volume and ultra low latency).

For example, it is studied for NR to provide radio communication services that are referred to as enhanced Mobile Broad Band (eMBB), massive Machine Type Communication (mMTC), and Ultra Reliable and Low Latency Communications (URLLC).

Furthermore, it is studied for LTE/NR to use various UL control channel configurations (UL control channel formats). When a UCI transmission method of legacy LTE systems (prior to LTE Rel. 13) is applied to these future radio communication systems, there is a risk that a coverage and/or a throughput deteriorate.

The present invention has been made in light of this point, and an object of the present invention is to provide a user terminal and a radio communication method that can appropriately notify UL control information in future radio communication systems.

Solution to Problem

A user terminal according to one aspect of the present invention includes: a transmission section that transmits a sequence by using a cyclic shift associated with a value of uplink control information; and a control section that controls determination of a cyclic shift associated with a specific candidate value of a plurality of candidate values of the uplink control information based on a parameter notified from a radio base station, and controls determination of a cyclic shift associated with another candidate value of the plurality of candidate values based on the determined cyclic shift.

Advantageous Effects of Invention

According to the present invention, it is possible to appropriately notify UL control information in future radio communication systems.

DESCRIPTION OF EMBODIMENTS

Figure 1A:
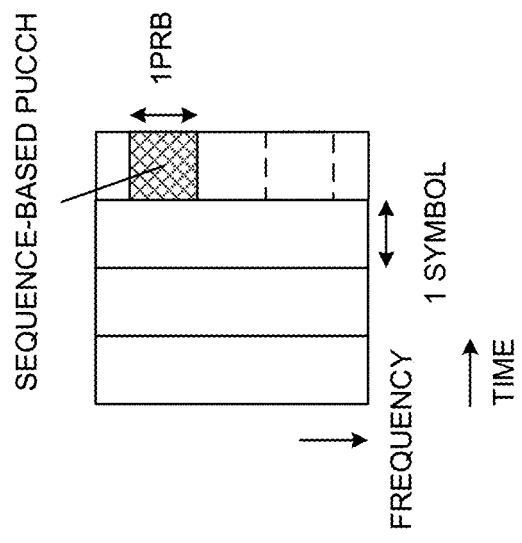
FIGS. 1A and 1B are diagrams illustrating one example of a sequence-based PUCCH.

It has been studied for future radio communication systems (e.g., LTE Rel. 14, 15 and subsequent releases, 5G and NR) to introduce a plurality of numerologies instead of a single numerology.

In addition, the numerologies may mean a communication parameter set that characterize a signal design of a certain Radio Access Technology (RAT) or an RAT design or may mean parameters such as SubCarrier-Spacing (SCS), a symbol length, a cyclic prefix length and a subframe length related to a frequency direction and/or a time direction.

Furthermore, as a plurality of numerologies are supported, it has been studied for the future radio communication systems to introduce identical and/or different time units (also referred to as, for example, a subframe, a slot, a mini slot, a subslot, a Transmission Time Interval (TTI), a short TTI (sTTI) and a radio frame) to and from those of legacy LTE systems (prior to LTE Rel. 13).

In addition, the TTI may represent a time unit at which a transport block, a code block and/or a codeword of transmission/received data are transmitted and received. When the TTI is given, a time interval (the number of symbols) in which the transport block, the code block and/or the codeword of data are actually mapped may be shorter than the TTI.

When, for example, the TTI includes a given number of symbols (e.g., 14 symbols), the transport block, the code block and/or the codeword of transmission/received data may be transmitted and received in one to a given number of symbol intervals of the symbols. When the number of symbols for transmitting and receiving the transport block, the code block and/or the codeword of the transmission/received data is smaller than the number of symbols in the TTI, a reference signal and a control signal can be mapped on symbols on which data is not mapped in the TTI.

A subframe may be a time unit having a given duration (e.g., one ms) irrespectively of numerologies used by (and/or configured to) a user terminal (e.g., UE: User Equipment).

On the other hand, a slot may be a time unit based on the numerologies used by the UE. When, for example, a subcarrier-spacing is 15 kHz or 30 kHz, the number of symbols per slot may be 7 or 14 symbols. When the subcarrier-spacing is 60 kHz or more, the number of symbols per slot may be 14 symbols. Furthermore, the slot may include a plurality of mini slots.

It is studied for these future radio communication systems to support a UL control channel (also referred to as a short PUCCH below) of a shorter duration than a Physical Uplink Control Channel (PUCCH) format of the legacy LTE systems (e.g., LTE Rel. 8 to 13), and/or a UL control channel (also referred to as a long PUCCH below) of a longer duration than the shorter duration.

The short PUCCH (a short PUCCH or a shortened PUCCH) includes a given number of symbols (e.g., one, two or three symbols) in a certain SCS. On the short PUCCH, Uplink Control Information (UCI) and a Reference Signal (RS) may be subjected to Time Division Multiplexing (TDM) or may be subjected to Frequency Division Multiplexing (FDM). The RS may be, for example, a DeModulation Reference Signal (DMRS) used to demodulate the UCI.

An SCS of each symbol of the short PUCCH may be the same as or higher than an SCS of a data channel symbol (also referred to as a data symbol below). A data channel may be, for example, a downlink data channel (PDSCH: Physical Downlink Shared Channel) or an uplink data channel (PUSCH: Physical Uplink Shared Channel).

Hereinafter, the simple expression "PUCCH" may be read as a "short PUCCH" or a "PUCCH in short duration".

The PUCCH may be subjected to TDM and/or FDM with a UL data channel (also referred to as a PUSCH below) in a slot. Furthermore, the PUCCH may be subjected to TDM and/or FDM with a DL data channel (also referred to as a PDSCH below) and/or a DL control channel (also referred to as a PDCCH: Physical Downlink Control Channel below) in a slot.

As short PUCCH transmission schemes, a DMRS-based PUCCH (DMRS-based transmission or a DMRS-based PUCCH) for notifying UCI by transmitting a UL signal obtained by performing FDM and/or TDM on the DMRS and the UCI, and a sequence-based PUCCH (sequence-based transmission or a sequence-based PUCCH) for notifying UCI by transmitting a UL signal that uses a code resource associated with a UCI value without using a DMRS are studied.

The DMRS-based PUCCH transmits the PUCCH including an RS for demodulating the UCI, and therefore may be referred to as coherent transmission or coherent design. The sequence-based PUCCH notifies the UCI by using the PUCCH that does not include the RS for demodulating the UCI, and therefore may be referred to as non-coherent transmission or non-coherent design.

It has been studied to map a sequence whose sequence length is 12 on 12 contiguous Resource Elements (REs) in a Physical Resource Block (PRB) for one symbol short PUCCH for UCI up to two bits. Sequences whose sequence lengths are 24 and 48 are may be used. The sequence-based PUCCH and another sequence may be multiplexed by using Code Division Multiplexing (CDM) or FDM.

The code resource for the sequence-based PUCCH is a resource that can be subjected to Code Division Multiplexing, and may be at least one of a base sequence, a cyclic shift amount (phase rotation amount) and an Orthogonal Cover Code (OCC). The cyclic shift may be read as phase rotation.

Information related to at least one of a time resource, a frequency resource and the code resource for the sequence-based PUCCH may be notified from a NetWork (the NW such as a base station or a gNodeB) to the UE by higher layer signaling (e.g., Radio Resource Control (RRC) signaling, Medium Access Control (MAC) signaling, and broadcast information (e.g., a Master Information Block (MIB) or a System Information Block (SIB)), physical layer signaling (e.g., DCI) or a combination of thereof.

The base sequence may be a Constant Amplitude Zero Auto-Correlation (CAZAC) sequence (e.g., Zadoff-chu sequence), or may be a sequence (Computer Generated CAZAC (CG-CAZAC) sequence) equivalent to the CAZAC sequence given by 3GPP TS 36.211 § 5.5.1.2 (Table 5.5.1.2-1 and Table 5.5.1.2-2 in particular). The number of base sequences is, for example, 30.

A case where the sequence-based PUCCH transmits two-bit UCI by using a Cyclic Shift (CS) will be described. The cyclic shift may be expressed as a phase rotation amount, and therefore may be paraphrased as the phrase rotation amount. A plurality of cyclic shift amount (phase rotation amount) candidates to be allocated to one UE will be referred to as a CS candidate set (a cyclic shift amount set, a cyclic shift amount pattern, a phase rotation amount candidate set and a phase rotation amount pattern).

Figure 1B:
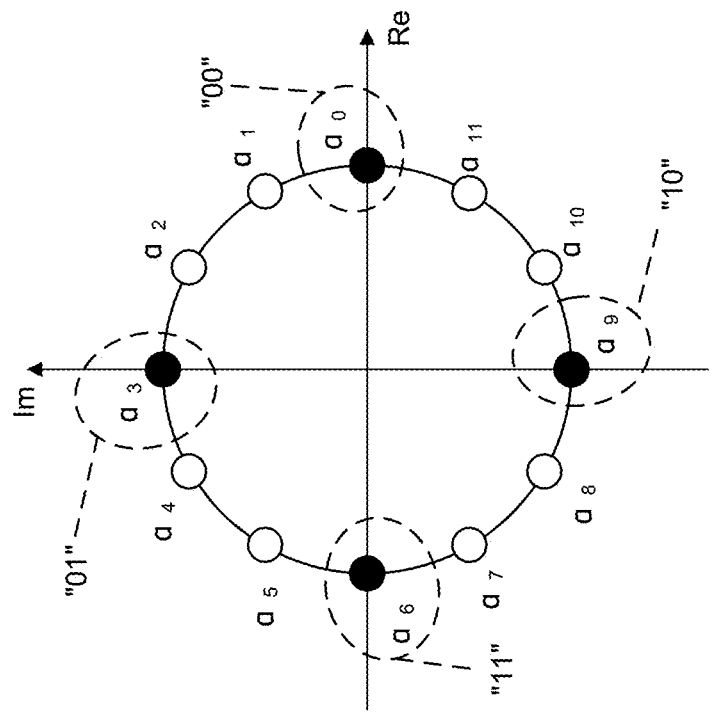
Figure 12:
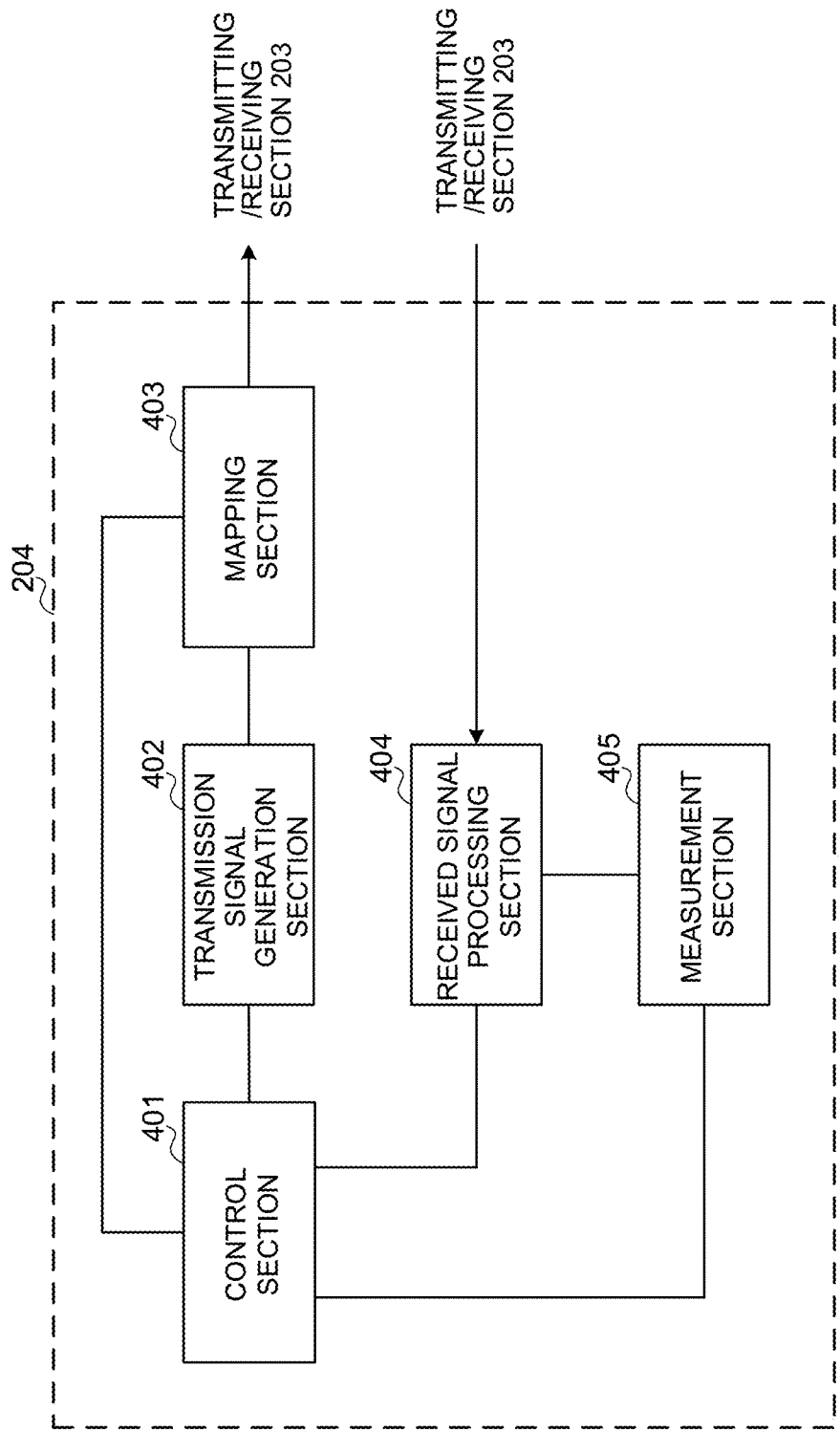
FIG. 12 is a diagram illustrating one example of a function configuration of the user terminal according to the one embodiment of the present invention.

The sequence length of the base sequence is determined based on a number of subcarriers M and the number of Physical Resource Blocks (PRB). As illustrated in FIG. 1A, when the sequence-based PUCCH is transmitted by using a band of one PRB, the sequence length of the base sequence is 12 (=12×1). In this case, as illustrated in FIG. 1B, 12 phase rotation amounts $\alpha_0$ to $\alpha_{11}$ having a phase interval of $2\pi/12$ (i.e., $\pi/6$) are defined. 12 sequences obtained by performing phrase rotation (cyclic shift) on one base sequence by using the phase rotation amounts $\alpha_0$ to $\alpha_{11}$ are orthogonal to each other (a mutual correlation is 0). In addition, the phase rotation amounts $\alpha_0$ to $\alpha_{11}$ may be defined based on at least one of the number of subcarriers M, the number of PRBs and the sequence length of the base sequence. The cyclic shift candidate set may include two or more phase rotations selected from the phase rotation amounts $\alpha_0$ to $\alpha_{11}$.

The sequence-based PUCCH notifies control information including at least one of ACK/NACK (A/N), CSI and an SR. In addition, UCI indicating A/N and/or CSI, and a positive SR may be referred to as UCI including the SR, and the UCI indicating A/N and/or the CSI, and a negative SR may be referred to as UCI that does not include the SR. In the following description, control information indicating A/N and/or the CSI will be referred to as UCI, and control information indicating the positive SR or the negative SR will be referred to as a positive/negative SR.

When, for example, the UCI is one bit, UCI values 0 and 1 may be associated with "NACK" and "ACK", respectively. When, for example, the UCI is two bits, the UCI values 00, 01, 11 and 10 may be associated with "NACK-NACK", "NACK-ACK", "ACK-ACK" and "ACK-NACK", respectively.

When, for example, the UCI is two bits as illustrated in FIG. 1B, the UE performs phase rotation on the base sequence by using a phase rotation amount associated with a value to be transmitted among four candidates of the two-bit UCI values, and transmits the signal subjected to the phase rotation by using the given time/frequency resources. The time/frequency resources are a time resource (e.g., a subframe, a slot or a symbol) and/or a frequency resource (e.g., a carrier frequency, a channel band, a Component Carrier (CC) or a PRB).

FIGS. 2A to 2D are diagrams illustrating one example of transmission signal generating processing for the sequence-based PUCCH. The transmission signal generating processing performs phrase rotation (cyclic shift) on base sequences X0 to XM−1 of a sequence length M by using the selected phase rotation amount $\alpha$, and inputs the base sequences subjected to the phase rotation to an Orthogonal Frequency Division Multiplexing (OFDM) transmitter or a Discrete Fourier Transform-Spread-Orthogonal Frequency Division Multiplexing (DFT-S-OFDM) transmitter. The UE transmits an output signal from the OFDM transmitter or the DFT-S-OFDM transmitter.

Figure 2A:
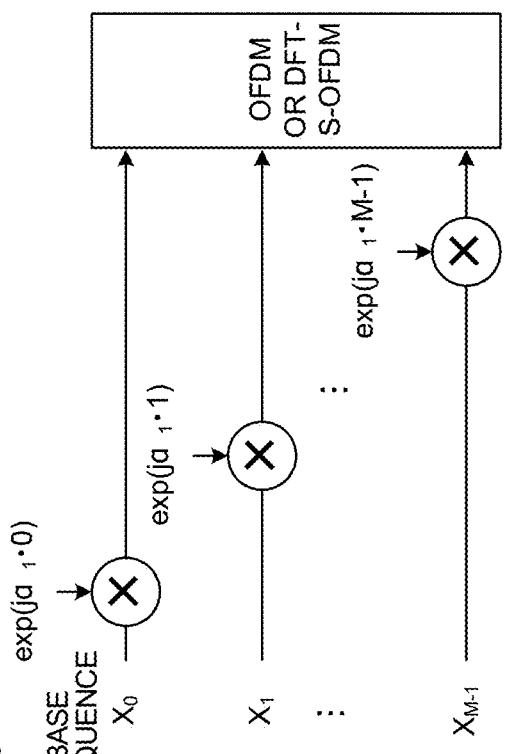
FIGS. 2A to 2D are diagrams illustrating one example of transmission signal generating processing for the sequence-based PUCCH.
Figure 2B:
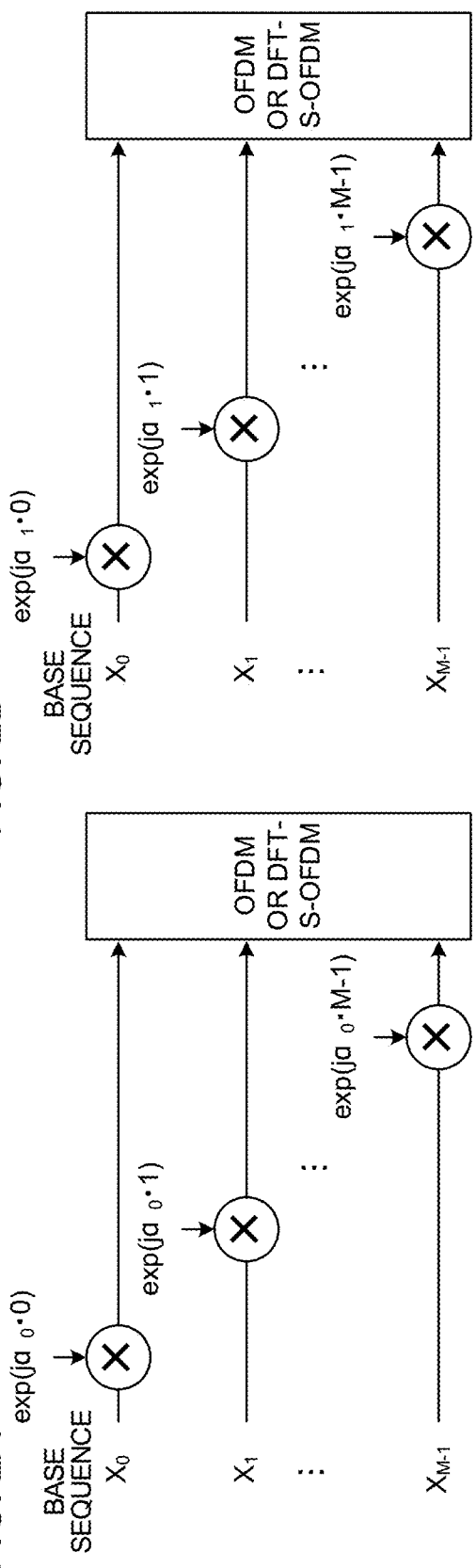
Figure 2C:
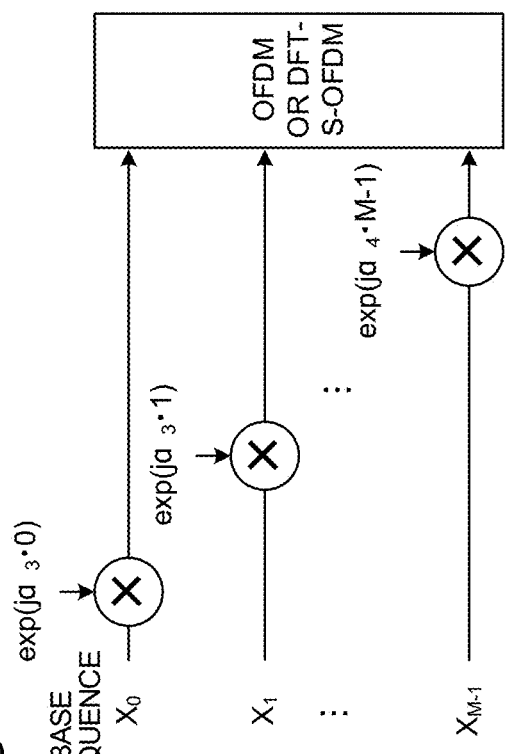
Figure 2D:
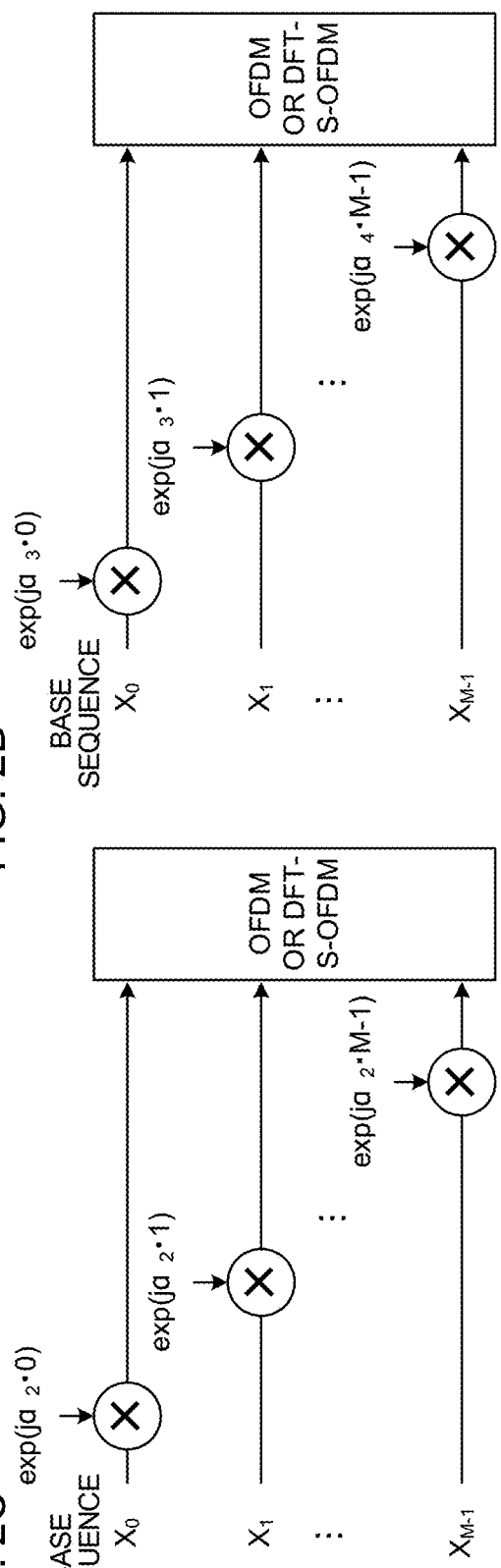

When UCI information candidates 0 to 3 are associated with phase rotation amount candidates $\alpha_0$ to $\alpha_3$, respectively, and information 0 is notified as the UCI, the UE performs phase rotation on the base sequences $X_0$ to $X_{M-1}$ by using the phase rotation amount $\alpha_0$ associated with the information 0 as illustrated in FIG. 2A. Similarly, when the pieces of information 1 to 3 are notified as the UCI, the UE performs phase rotation on the base sequences $X_0$ to $X_{M-1}$ by using the phase rotation amounts $\alpha_1$, $\alpha_2$ and $\alpha_3$ associated with the pieces of information 1 to 3 as illustrated in FIGS. 2B, 2C and 2D.

Next, decoding of the UCI notified by the sequence-based PUCCH will be described. Hereinafter, a reception decision operation of notifying the UCI by selecting a phase rotation amount will be described. However, the same applies to a case where the UCI is notified by selecting a combination of another type of a resource (e.g., the base sequence or the time/frequency resources) or a plurality of types of resources.

The NW may decide the UCI by using Maximum Likelihood Detection (that may be referred to as MLD or mutual detection) from the received signal. More specifically, the network may generate a replica (phase rotation amount replica) of each phase rotation amount allocated to the user terminal (i.e., generate phase rotation amount replicas of four patterns when, for example, a UCI payload length is two bits), and generate a transmission signal waveform similar to the user terminal by using the base sequence and the phase rotation amount replica. Furthermore, the network may calculate for all phase rotation amount replicas a correlation between the obtained transmission signal waveform and a received signal waveform received from the user terminal, and estimate that the phase rotation amount replica of the highest correlation has been transmitted.

More specifically, the network multiplies each element of a received signal sequence (M complex number sequences) of a size M after DFT with a complex conjugate of a transmission signal sequence (M complex number sequences) obtained by performing phase rotation of a phase rotation amount replica on the base sequence of the transmission signal. It may be assumed that a phase rotation amount replica that maximizes an absolute value (or a square of the absolute value) of a total of the obtained M sequences has been transmitted.

Furthermore, the network may generate transmission signal replicas corresponding to a maximum allocation number (12 in a case of one PRB) of the phase rotation amount, and estimate a phase rotation amount of the highest correlation with the received signal by the same operation as that of the above MLD. When the phase rotation amount other than the allocated phase rotation amounts is estimated, it may be estimated that the phase rotation amount closest to the estimated phase rotation amount among the allocated phase rotation amounts has been transmitted.

The base station decides a UCI value and a positive/negative SR by performing MLD on the received sequence-based PUCCH.

To use the sequence-based PUCCH, the NW needs to configure resource numbers associated with UCI candidate values to the UE. When the UCI is one bit, the number of the resource numbers associated with the UCI candidate values is two. When the UCI is two bits, the number of resource numbers associated with the UCI candidate values is four. Each bit of the UCI indicates, for example, ACK or NACK.

The resource number may be a symbol number and/or a slot number indicating a time resource of the sequence-based PUCCH. The resource number may be a PRB index indicating a frequency resource of the sequence-based PUCCH. The resource number may be a sequence number (sequence index) indicating the base sequence used for the sequence-based PUCCH. When the sequence length of the base sequence is 12, the sequence number may indicate any one of 0 to 29. The resource number may be a CS index used for the sequence-based PUCCH. When the sequence length of the base sequence is 12, the CS index may indicate any one of 0 to 11. The number of CS indices that can be used for the sequence-based PUCCH may be limited.

The number, the index, the identifier and the identification information can be paraphrased with each other.

A problem is how to configure a CS candidate set to the UE that uses the sequence-based PUCCH in this way. Hence, the inventors of the invention have studied a method for configuring the CS candidate sets to the UE, and have arrived at the present invention.

The embodiments according to the present invention will be described in detail below with reference to the drawings. A radio communication method according to each embodiment may be applied alone or may be applied in combination.

Radio Communication Method

First Embodiment

According to the first embodiment, a resource number of a specific candidate value of a plurality of candidate values of UCI is determined based on parameters notified from a NW, and other resource numbers of a plurality of candidate values are determined based on the resource number of the specific candidate value.

The resource number of the specific candidate value may be notified as the parameter to the UE. The UE determines the resource numbers of the other candidate values based on the resource number of the specific candidate value.

A case where UCI indicates ACK/NACK, and the UE determines a CS index that is a resource number will be described below.

The NW may notify the UE of the resource number of the specific candidate value by higher layer signaling (e.g., RRC signaling and/or broadcast information (an MIB or an SIB)).

When the UCI length is one bit, candidate values 0 and 1 indicate NACK (N) and ACK (A), respectively. The NW notifies the UE of a CS index of a specific candidate value N. The UE determines a CS index of A based on a resource number of N.

When a UCI length is two bits, candidate values 00, 01, 11 and 10 indicate N-N, N-A, A-A and A-N, respectively. The NW notifies the UE of the resource number of the specific candidate value N. The UE determines the CS index of A based on the CS index of N.

In this regard, a sequence length (the number of REs) of a sequence-based PUCCH is L, and the number of CS candidates (the number of UCSI candidate values) in a CS candidate set is K. The CS index is 0, 1, . . . or L−1. When an interval between the CS candidates in the CS candidate set is a fixed CS index interval D, the CS index interval D is expressed by L/K.

The CS candidates (phase rotation amounts) in each CS candidate set may have an interval of 2π/K. By using this CS candidate set, the phase of a specific RE becomes fixed irrespectively of the candidate values. The NW can perform channel estimation by using a signal of the specific RE. That is, the NW can use the signal of the specific RE as a DeModulation Reference Signal (DMRS). The NW may demodulate UCI by using a channel estimation result. By using this CS candidate set, the NW can use a flexible configuration of a receiver.

For example, the NW may demodulate the UCI by using above-described MLD, may demodulate the UCI based on the channel estimation result of the DMRS of the specific RE or may demodulate the UCI based on a combination of MLD and the channel estimation result. Furthermore, the NW may estimate a noise variance by using the specific RE.

A case where the sequence length L is 12 will be described below. However, the sequence length L may not be 12. For example, the sequence length L may be 24 or 48.

Figure 3A:
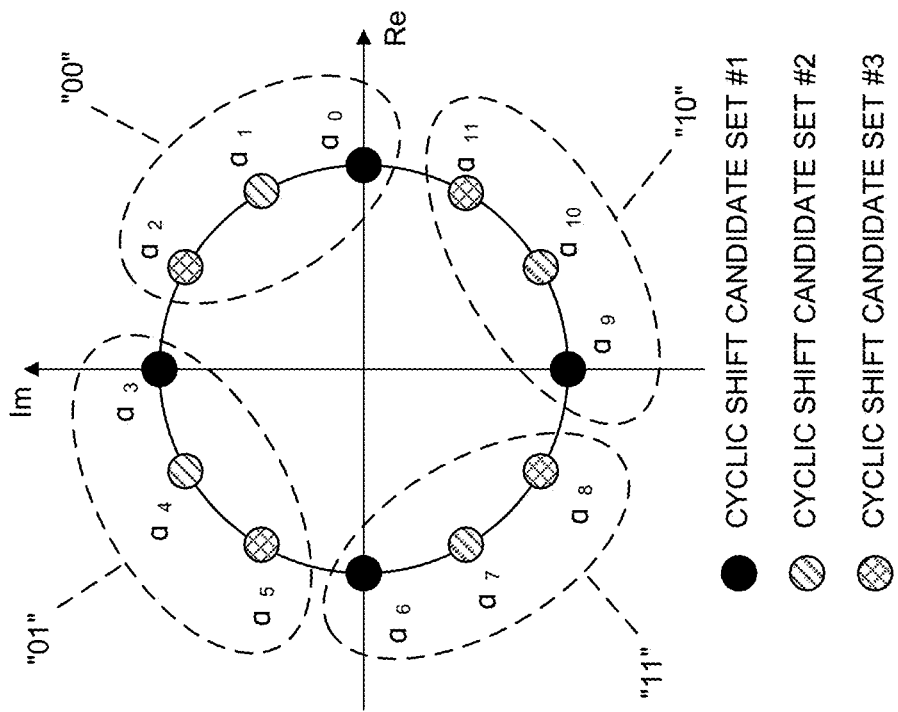
FIGS. 3A and 3B are diagrams illustrating one example of CS candidate sets of equal intervals.

As illustrated in FIG. 3A, when the UCI length is one bit, the number of CS candidates K is two and the CS index interval D is six, and therefore CS candidate sets #1 to #6 are configured, and each CS candidate set includes two CS indices. The NW configures different CS candidate sets to different UEs to multiplex sequence-based PUCCHs of the UEs up to six sequence-based PUCCHs.

When the UCI length is one bit, the CS candidates in each CS candidate set have an interval of 2π/K, i.e., an interval of t. By using this CS candidate set, signals of six specific REs having an interval of two REs among 12 REs become fixed irrespectively of candidate values, and can be used as DMRSs.

Figure 3B:
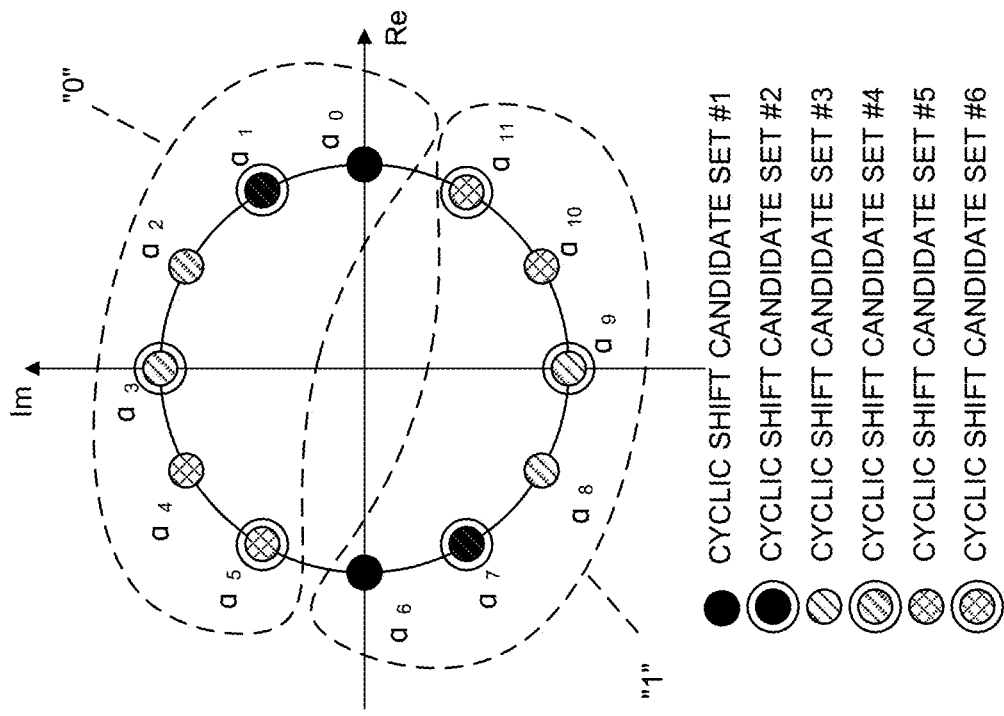

As illustrated in FIG. 3B, when the UCI length is two bits, the number of CS candidates K is four and the CS index interval D is three, and therefore the CS candidate sets #1 to #3 are configured, and each CS candidate set includes four CS indices. The NW configures the different CS candidate sets to the different UEs to multiplex sequence-based PUCCHs of the UEs up to three sequence-based PUCCHs.

When the UCI length is two bits, the CS candidates in each CS candidate set have an interval of 2π/K, i.e., an interval of t. By using this CS candidate set, signals of three specific REs having an interval of four REs among the 12 REs become fixed irrespectively of the candidate values, and can be used as DMRSs.

When notified of a CS index I of a specific candidate value, the UE determines CS indices of other candidate values by sequentially adding the CS index interval D to the CS index I of the specific candidate value. According to this operation, the UE can determine the CS candidate sets.

For example, in the CS candidate sets #1 to #3 illustrated in FIG. 3B, the UCI length is two bits, and therefore the CS index interval D is three. When notified of 1 as the CS index of the specific candidate value, the UE determines 4, 7 and 10 as the other CS indices by using the CS index interval D.

<<Resource Number Determination Method in Case where CS Index Interval or Maximum UE Multiplexing Number is Notified>>

A usable CS index interval will be referred to as a usable index interval X, and a maximum number of UEs that can be multiplexed by a CS will be referred to as a maximum UE multiplexing number M. The usable index interval X or the maximum UE multiplexing number M may be notified as a parameter from the NW to the UE by higher layer signaling (e.g., RRC signaling and/or broadcast information). The number of CS candidate sets is equal to M.

When notifying the UE of X or M, the NW may notify the UE of a CS candidate set index S as a parameter instead of the CS index of the specific candidate value. The CS candidate set index S is 1, 2, . . . or M. The UE may determine the CS candidate set based on the usable index interval X or the maximum UE multiplexing number M, and the CS candidate set index S.

When the usable index interval X is notified, the UE determines (S−1)+X×S as the CS index of the specific candidate value, and determines CS indices of other candidate values by sequentially adding D to the CS index of the specific candidate value. According to this operation, the UE can determine the CS candidate sets.

When the maximum UE multiplexing number M is notified, the usable index interval X can be obtained by L/K/M, so that the UE can determine the CS candidate sets similar to a case where the usable index interval X is notified.

Figure 4C:
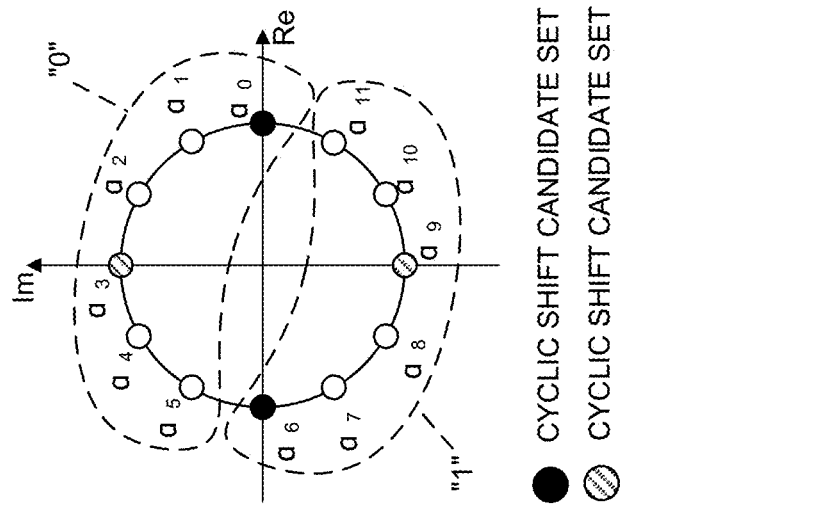
FIGS. 4A to 4C are diagrams illustrating one example of CS candidate sets in a case where a UCI length is one bit.
Figure 4B:
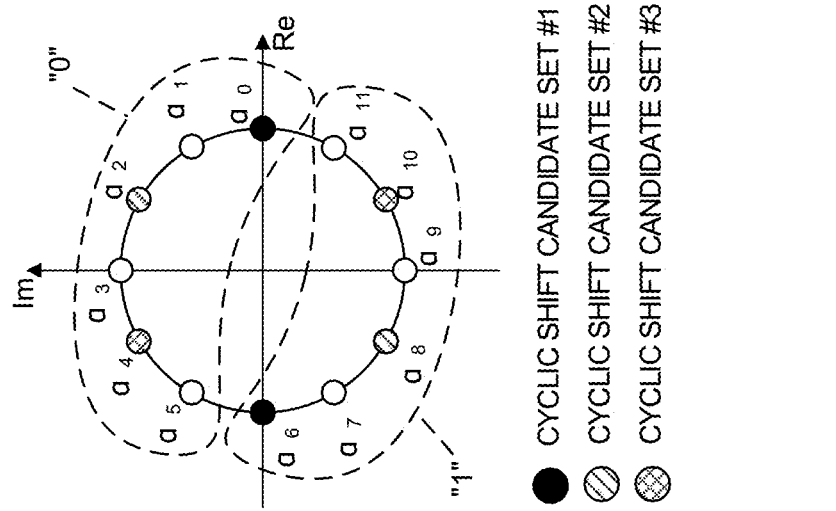
Figure 4A:
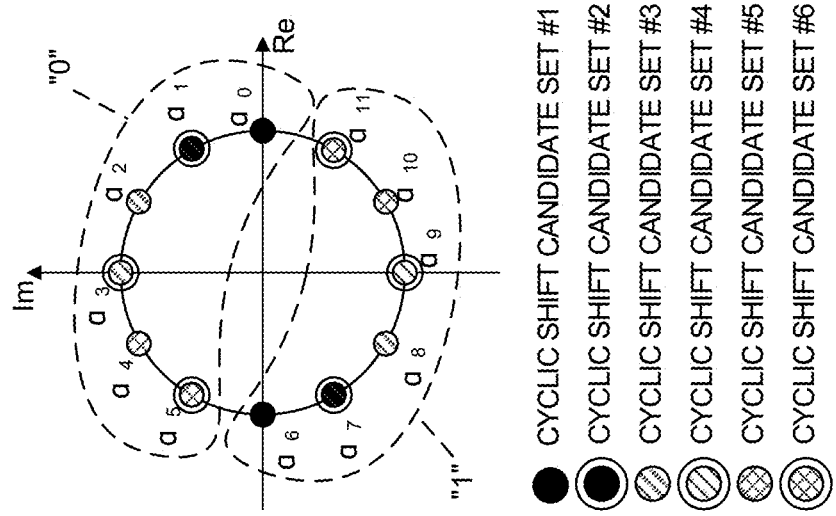

FIGS. 4A to 4C are diagrams illustrating one example of CS candidate sets in a case where the UCI length is one bit. In this case, a number of CS candidates K is two, and the CS index interval D is three.

FIG. 4A illustrates a case where the usable index interval X is one, and the maximum UE multiplexing number M is six. When, for example, the CS candidate set index S is 2, the UE determines CS indices in the CS candidate set as 1 and 7.

FIG. 4B illustrates a case where the usable index interval X is two, and the maximum UE multiplexing number M is three. When, for example, the CS candidate set index S is 2, the UE determines the CS indices in the CS candidate set as 2 and 8.

FIG. 4C illustrates a case where the usable index interval X is three and the maximum UE multiplexing number M is two. When, for example, the CS candidate set index S is 2, the UE determines the CS indices in the CS candidate set as 3 and 9.

The number of CS indices of the specific candidate values is L and the number of CS candidate set indices S is M, and therefore when the usable index interval X is two or more, an information amount of the CS candidate set indices S is smaller than an information amount of the CS index of the specific candidate value.

When, for example, the UCI length is one bit, the CS index of the specific candidate value is one of 0 to 5, and therefore the information amount of the CS index of the specific candidate value is three bits. When, for example, the usable index interval X is two, the CS candidate set index S is one of 1 to 3, and therefore the information amount of the CS candidate set indices S is two bits.

According to this resource number determination method, it is possible to determine CS candidate sets of equal intervals (phase $2\pi/K$) and suppress a notification overhead of the CS candidate sets.

By increasing the usable index interval X or decreasing the maximum UE multiplexing number M and increasing the intervals between CS candidates (phase rotation amounts), it is possible to suppress an error rate of UCI in environment of high frequency selectivity.

<<Resource Number Determining Method of UE>>

Whether or not sequence-based PUCCHs of different UEs are multiplexed (CDM) (whether or not UE multiplexing is performed) by using different CSs (in a CS domain) may be notified as a parameter from the NW to the UE by higher layer signaling (e.g., RRC signaling and/or broadcast information).

When performing UE multiplexing, the NW allocates different CS candidate sets to the different UEs, and notifies the UEs of that the UE multiplexing is performed. In this case, as described above, the UE may be notified of the CS index of the specific candidate value in the CS candidate set, and determine the other CS indices in the CS candidate set based on the CS index of the specific candidate value.

When notified of that the UE multiplexing is not performed, the UE may determine the CS candidate set based on a given rule. The NW also determines the CS candidate set by using the same rule as that of the UE, so that the NW and the UE can determine the identical CS candidate set.

The CS candidate set index may be determined based on at least one of a UE index (UE ID), a slot index and a cell index (cell ID). For example, the CS candidate set index may be determined by ((UE index×cell index) mod D)+1.

Figure 5B:
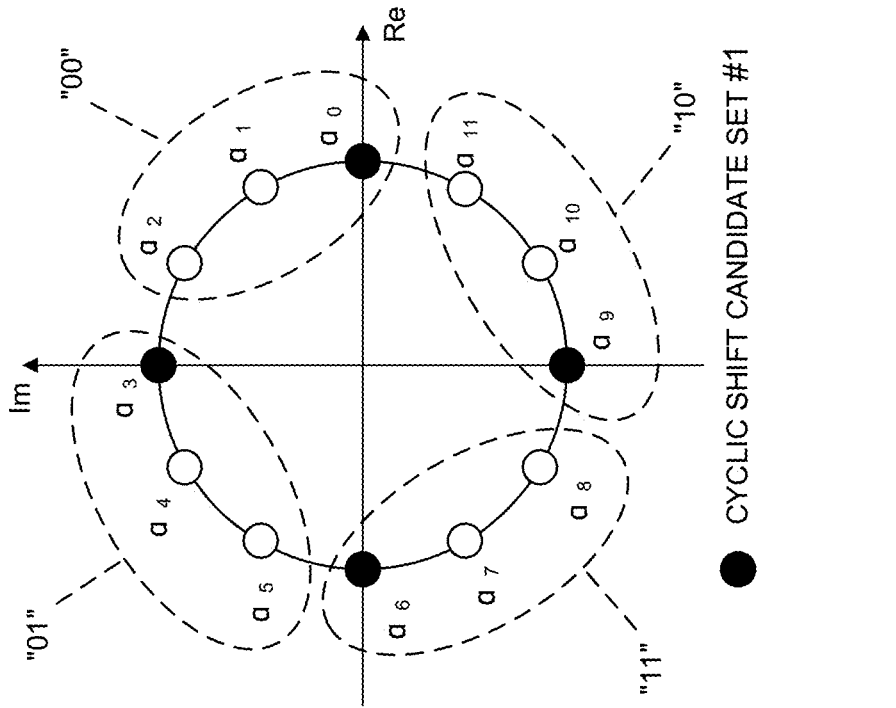
FIGS. 5A and 5B are diagrams illustrating one example of CS candidate sets in a case where the UCI length is two bits.
Figure 5A:
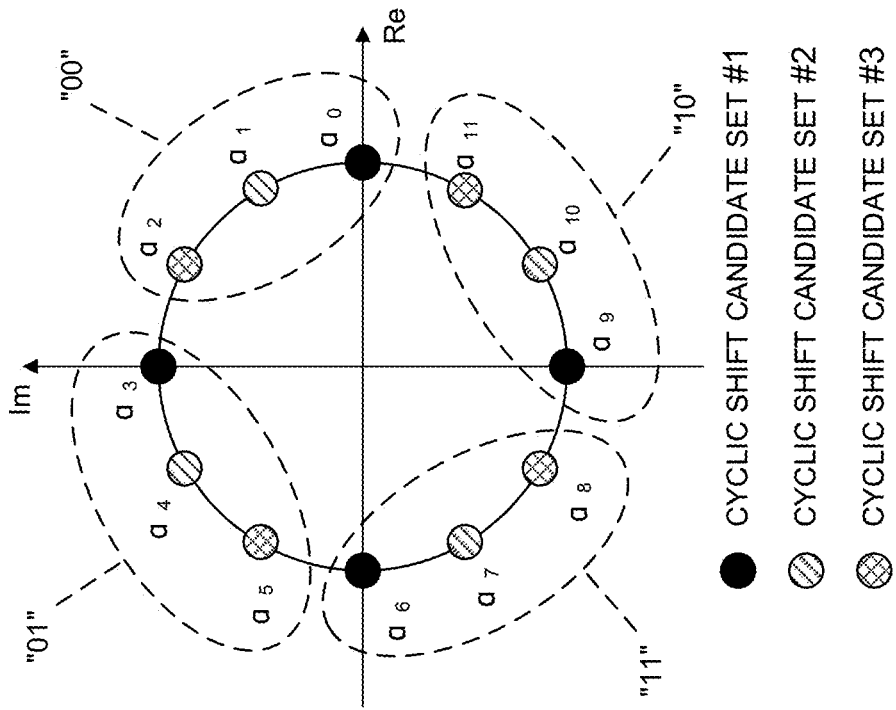

FIGS. 5A and 5B are diagrams illustrating one example of CS candidate sets in a case where the UCI length is two bits.

FIG. 5A illustrates a case where UE multiplexing is performed. In this case, the number of CS candidates K is two, and the CS index interval D is three. When, for example, the CS candidate set index S is 2, the UE determines the CS indices in the CS candidate set as 1, 4, 7 and 10.

FIG. 5B illustrates a case where UE multiplexing is not performed. In the example in FIG. 5B, the UCI length is two bits. When determining the CS candidate set index as 1 based on the UE index and the cell index, the UE determines the CS indices in the CS candidate set as 0, 3, 6 and 9.

By determining the CS candidate set index based on at least one of the UE index, the slot index and the cell index, it is possible to randomize the CS candidate set index. Furthermore, by determining the CS candidate set index based on the cell index, it is possible to reduce a probability that CS candidate set indices match between neighbor cells, and prevent an inter-cell interference.

The information amount of notification indicating whether or not to perform UE multiplexing is one bit, and therefore is smaller than the information amount of the CS index of the specific candidate value. When UE multiplexing is not performed, the UE does not receive information indicating a CS candidate or a CS candidate set, and therefore can suppress a notification overhead.

Furthermore, the information indicating whether or not to perform UE multiplexing may be based on another information notified from the NW.

The information indicating not to perform UE multiplexing may an invalid value of the usable index interval X or the maximum UE multiplexing number M. For example, in the example in FIGS. 4A to 4C, that one of one to three is notified as the usable index interval X may indicate that UE multiplexing is performed, and that zero or four is notified as the usable index interval X may indicate that UE multiplexing is not performed. Furthermore, that one of two, three and six is notified as the maximum UE multiplexing number M may indicate that UE multiplexing is performed, and that zero or one is notified as the maximum UE multiplexing number M may indicate that UE multiplexing is not performed.

Information indicating that UE multiplexing is performed may be a valid value of the usable index interval X or the maximum UE multiplexing number M.

When that UE multiplexing is not performed is not explicitly notified, the UE may determine the CS candidate set.

The CS candidate set index may be determined based on at least one of the UE index, the slot index, the cell index, the PRB index (that may be minimum and maximum PRB indices in a case where a sequence-based PUCCH uses a plurality of PRBs), a Control Channel Element (CCE) index of a PDCCH, a HARQ process ID, and parameters of resource indices (that may be minimum and maximum indices) of the PDSCH associated with A/N transmitted on the PUCCH. A surplus of D of a value Z obtained from one of these parameters may be used for the CS candidate set index. For example, the CS candidate set index may be determined by ((UE index×cell index×PRB index) mod D)+1.

The UE may use as each parameter a parameter obtained by converting the parameters notified from the NW by a given conversion formula. For example, a value W notified by higher layer signaling (e.g., RRC signaling or broadcast information) and the PRB index notified from the NW may be used to use PRB index+(W mod PRB index) as a new PRB index to calculate a CS candidate set index.

Second Embodiment

According to the second embodiment, CS candidates in a CS candidate set may not have an interval of $2\pi/K$.

A CS candidate interval Y indicates an interval between CS candidates in the CS candidate set in units of the number of usable CS indices. The CS candidate interval Y may be notified as a parameter from a NW to a UE by higher layer signaling (e.g., RRC signaling and/or broadcast information).

The UE may determine the CS candidate set based on a usable index interval X or a maximum UE multiplexing number M, the CS candidate interval Y and a CS index of a specific candidate value.

When the usable index interval X and the CS candidate interval Y are notified, a CS index interval D can be obtained by X×Y. When the maximum UE multiplexing number M and the CS candidate interval Y are notified, the CS index interval D can be obtained by L/K/M×Y.

When notified of a CS index I of a specific candidate value, the UE determines CS indices of other candidate values by sequentially adding the CS index interval D to the CS index I of the specific candidate value.

Figure 6A:
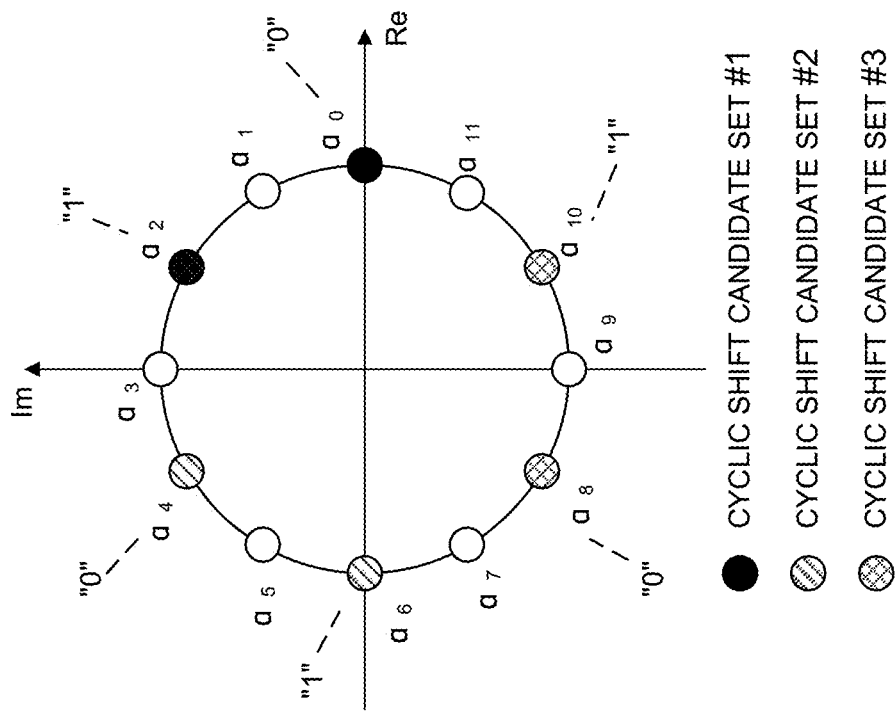
FIGS. 6A and 6B are diagrams illustrating one example of CS candidate sets in a case where the UCI length is one bit, a usable index interval X is two, and the maximum UE multiplexing number is three.
Figure 6B:
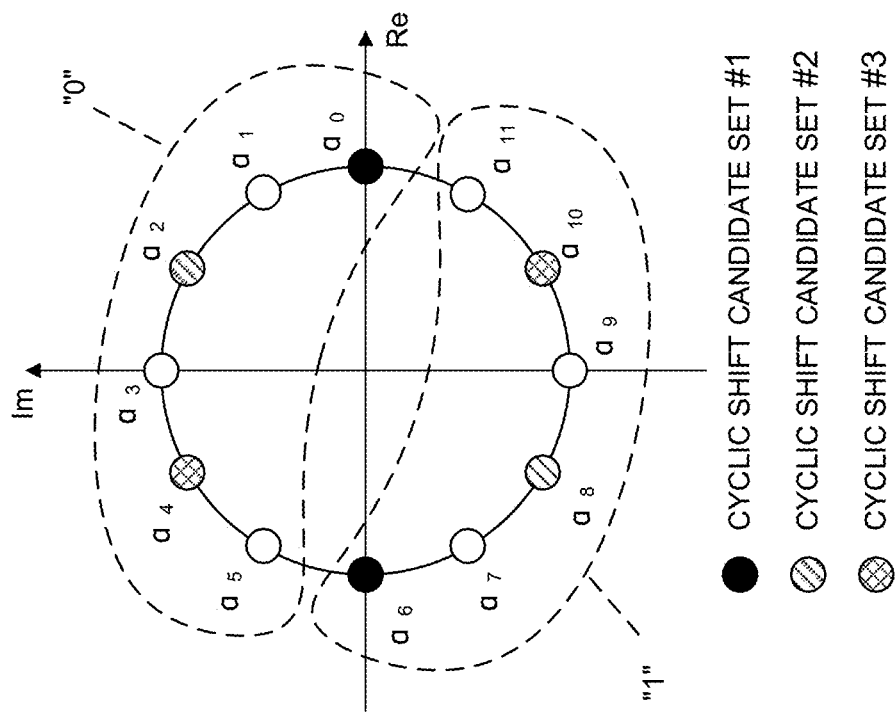

FIGS. 6A and 6B are diagrams illustrating one example of CS candidate sets in a case where a UCI length is one bit, the usable index X is two and the maximum UE multiplexing number M is three.

FIG. 6A illustrates a case where the CS candidate interval Y is three. In this case, the CS index interval D is six. When, for example, notified of 4 as the CS index I of the specific candidate value, the UE determines 10 as the CS index of the other candidate value.

FIG. 6B illustrates a case where the CS candidate interval Y is one. In this case, the CS index interval D is two. When, for example, notified of 4 as the CS index I of the specific candidate value, the UE determines 6 as the CS index of the another candidate value.

According to the above second embodiment, the CS candidates in the CS candidate set do not have an interval of $2\pi/K$, so that the UE can appropriately configure the CS candidate set. Furthermore, it is possible to suppress a notification overhead compared to a case where all CS indices in the CS candidate set are notified from the NW to the UE.

Third Embodiment

An error rate may be reduced by associating UCI candidate values and CS indices.

When a UCI length is two bits, a Gray code may be used to map the candidate values.

Figure 7A:
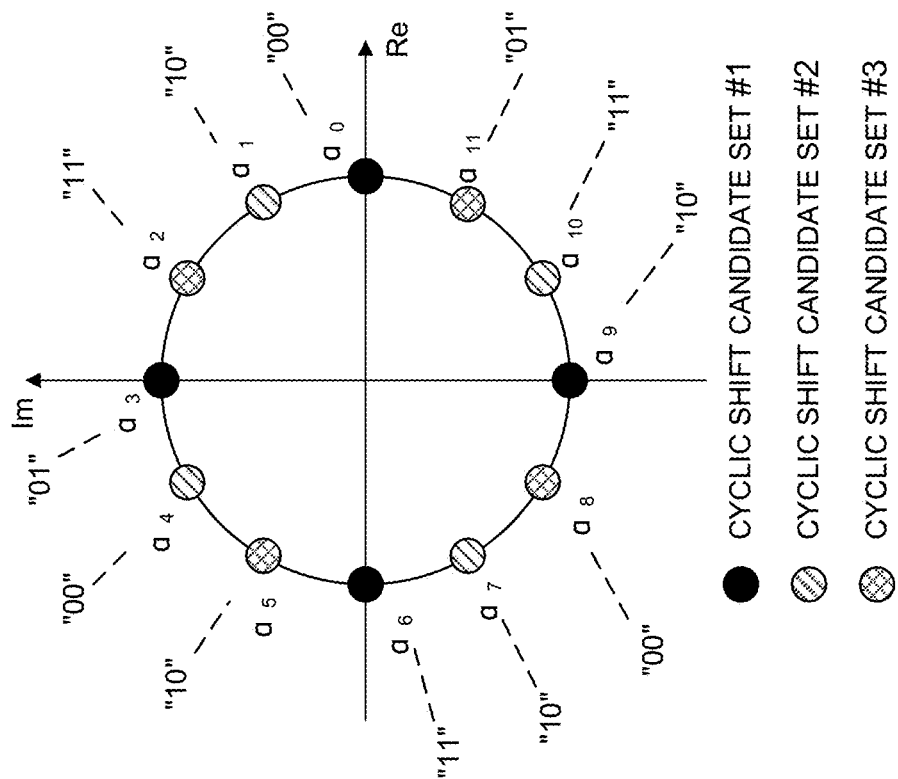
FIGS. 7A and 7B are diagrams illustrating one example of association between UCI candidate values and CS indices.

FIG. 7A is a diagram illustrating one example of mapping of the candidate values that use the Gray code. Even when CS candidates (phase rotation amounts) of neighbor demodulation results change in environment of high frequency selectivity, one bit of two bits is an error, so that it is possible to suppress the error rate.

Under conditions that mutually neighbor CS candidates (phase rotation amounts) are allocated to an identical candidate value of different UEs, the candidate values may be associated with the CS candidates. Particularly, the mutually neighbor CS candidates are prevented from being allocated to ACK or ACK-ACK of different UEs. An occurrence probability of ACK transmission is approximately 90%, so that, by separating the CS candidates of different ACK, it is possible to improve an ACK to NACK error rate and a NACK to ACK error rate.

Figure 7B:
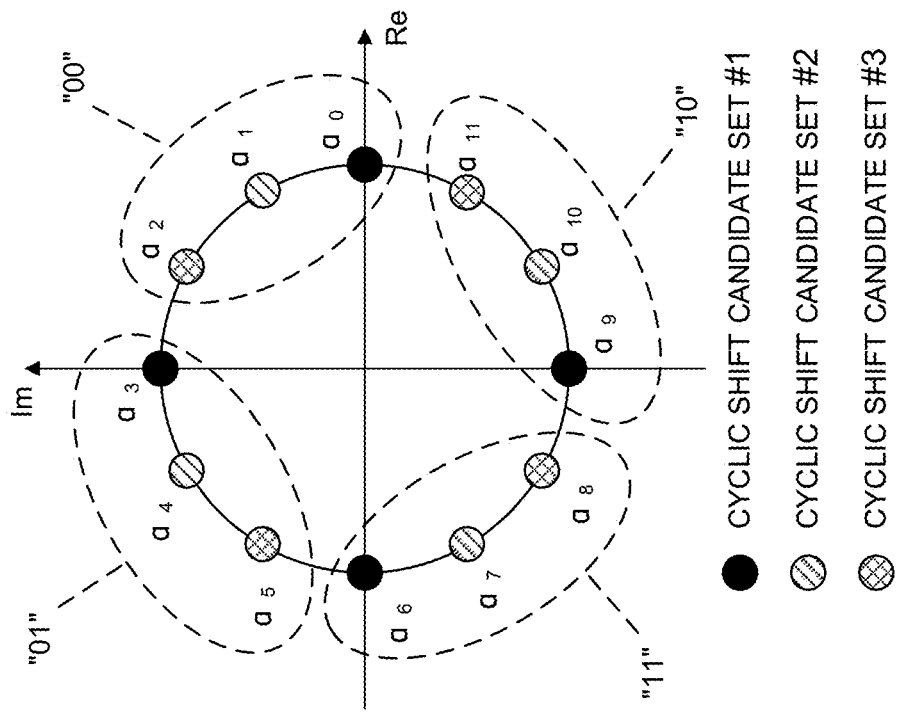

FIG. 7B is a diagram illustrating one example of mapping of candidate values that prevents ACK-ACK from being neighbor. For example, a next CS candidate set is rotated leftward by $\pi/2$ with respect to one CS candidate set in FIG. 7A. When the UCI length is one bit, ACK and NACK of different UEs may be alternately disposed.

According to the above third embodiment, it is possible to suppress an error rate of UCI by associating candidate values and CS candidates.

(Radio Communication System) The configuration of the radio communication system according to one embodiment of the present invention will be described below. This radio communication system uses one or a combination of the radio communication method according to each of the above embodiments of the present invention to perform communication.

Figure 8:
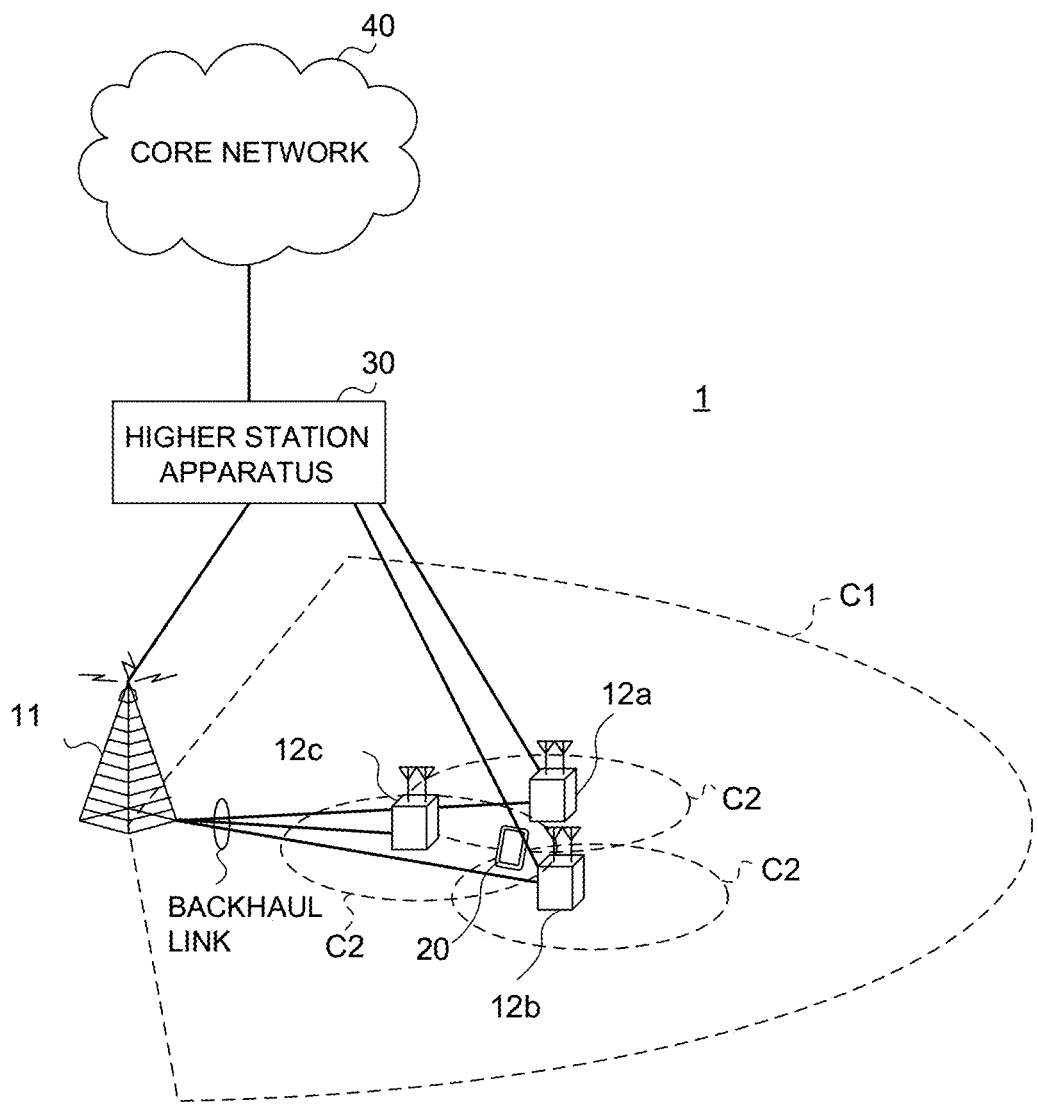
FIG. 8 is a diagram illustrating one example of a schematic configuration of a radio communication system according to one embodiment of the present invention.

FIG. 8 is a diagram illustrating one example of a schematic configuration of the radio communication system according to the one embodiment of the present invention. A radio communication system 1 can apply Carrier Aggregation (CA) and/or Dual Connectivity (DC) that aggregate a plurality of base frequency blocks (component carriers) whose one unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and user terminals 20 are not limited to those illustrated in FIG. 8.

The user terminal 20 can connect with both of the radio base station 11 and the radio base stations 12. The user terminal 20 is assumed to concurrently use the macro cell C1 and the small cells C2 by CA or DC. Furthermore, the user terminal 20 can apply CA or DC by using a plurality of cells (CCs) (e.g., five CCs or less or six CCs or more).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) may be configured to be connected by way of wired connection (e.g., optical fibers compliant with a Common Public Radio Interface (CPRI) or an X2 interface) or by way of radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and Single Carrier Frequency Division Multiple Access (SC-FDMA) and/or OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band of one or contiguous resource blocks per terminal and causes a plurality of terminals to use respectively different bands to reduce an inter-terminal interference. In this regard, uplink and downlink radio access schemes are not limited to a combination of these, and other radio access schemes may be used for the uplink and downlink radio access schemes.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and System Information Blocks (SIBs) are transmitted on the PDSCH. Furthermore, Master Information Blocks (MIBs) are transmitted on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and/or the PUSCH is transmitted on the PDCCH.

In addition, scheduling information may be notified by DCI. For example, the DCI for scheduling DL data reception may be referred to as a DL assignment, and the DCI for scheduling UL data transmission may be referred to as a UL grant.

The number of OFDM symbols used for the PDCCH is transmitted on the PCFICH. Transmission acknowledgement information (also referred to as, for example, retransmission control information, HARQ-ACK or ACK/NACK) of a Hybrid Automatic Repeat reQuest (HARQ) for the PUSCH is transmitted on the PHICH. The EPDCCH is subjected to frequency division multiplexing with the PDSCH (downlink shared data channel) and is used to transmit DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are transmitted on the PUSCH. Furthermore, downlink radio quality information (CQI: Channel Quality Indicator), transmission acknowledgement information and a Scheduling Request (SR) are transmitted on the PUCCH. A random access preamble for establishing connection with a cell is transmitted on the PRACH.

The radio communication system 1 transmits a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 transmits a Sounding Reference Signal (SRS) and a DeModulation Reference Signal (DMRS) as uplink reference signals. In this regard, the DMRS may be referred to as a user terminal specific reference signal (UE-specific Reference Signal). Furthermore, a reference signal to be transmitted is not limited to these.

<Radio Base Station>

Figure 9:
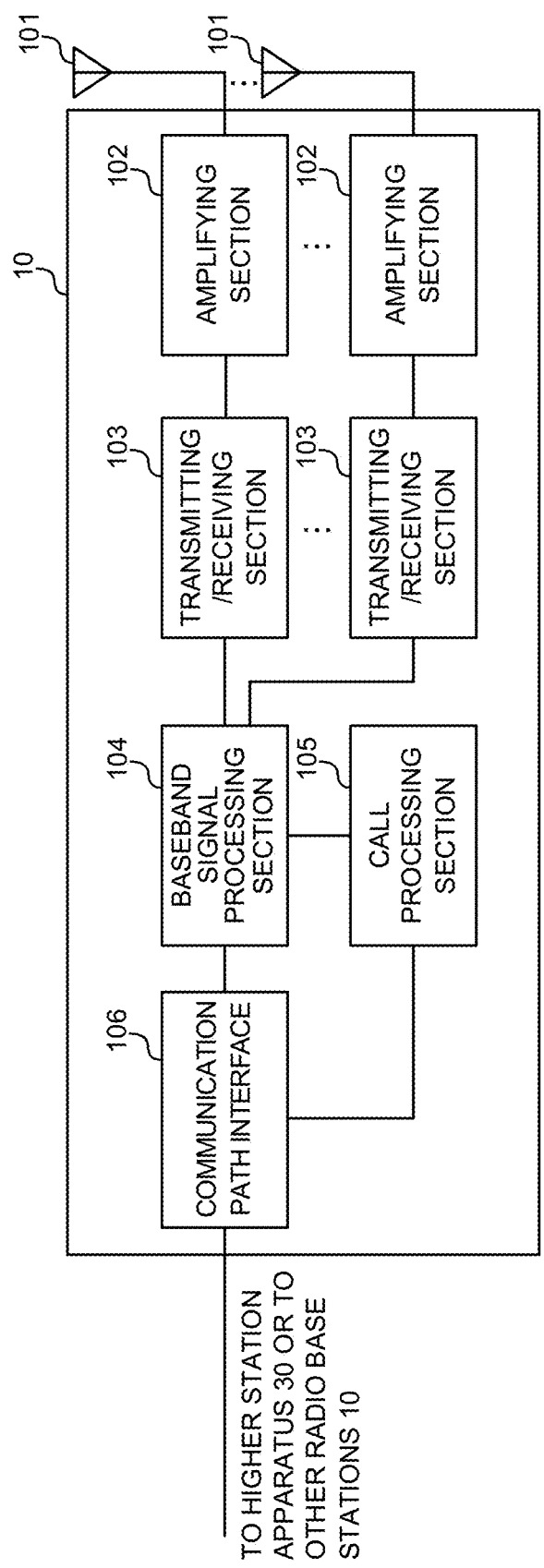
FIG. 9 is a diagram illustrating one example of an overall configuration of a radio base station according to the one embodiment of the present invention.

FIG. 9 is a diagram illustrating one example of an overall configuration of the radio base station according to the one embodiment of the present invention. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of an RLC layer such as Radio Link Control (RLC) retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmission/reception section 103. Furthermore, the baseband signal processing section 104 performs transmission processing such as channel coding and inverse fast Fourier transform on a downlink control signal, too, and transfers the downlink control signal to each transmission/reception section 103.

Each transmission/reception section 103 converts a baseband signal precoded and output per antenna from the baseband signal processing section 104 into a radio frequency band, and transmits a radio frequency signal. The radio frequency signal subjected to frequency conversion by each transmission/reception section 103 is amplified by each amplifying section 102, and is transmitted from each transmission/reception antenna 101. The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

On the other hand, each amplifying section 102 amplifies a radio frequency signal received by each transmission/reception antenna 101 as an uplink signal. Each transmission/reception section 103 receives the uplink signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on user data included in the input uplink signal, and transfers the user data to the higher station apparatus 30 via the channel interface 106. The call processing section 105 performs call processing (such as a configuration and release) of a communication channel, state management of the radio base station 10, and radio resource management.

The channel interface 106 transmits and receives signals to and from the higher station apparatus 30 via a given interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

Furthermore, each transmission/reception section 103 may receive a sequence (sequence-based PUCCH) by using a cyclic shift associated with a value of Uplink Control Information (UCI).

Furthermore, each transmission/reception section 103 may transmit a parameter for the sequence-based PUCCH to the user terminal 20.

Figure 10:
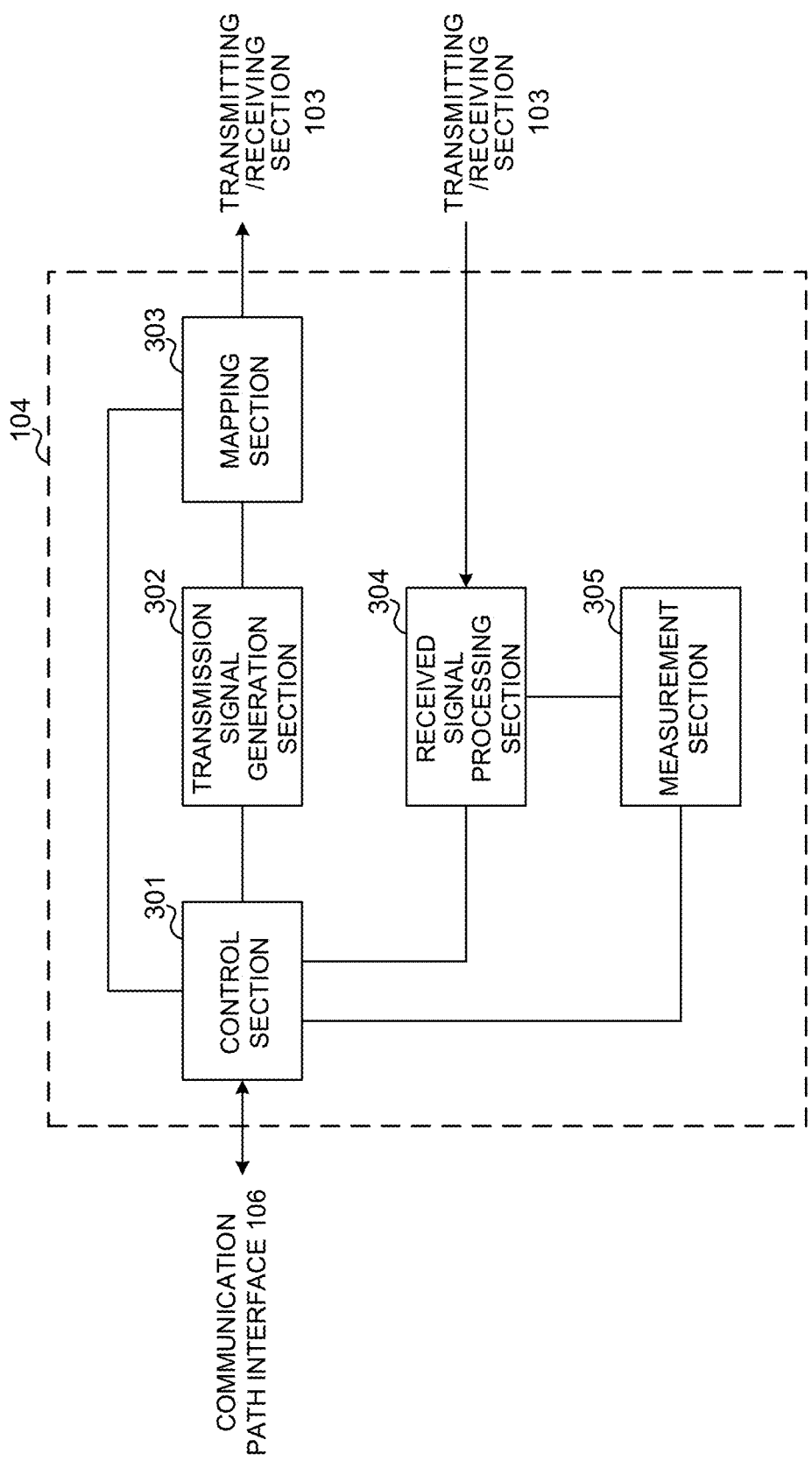
FIG. 10 is a diagram illustrating one example of a function configuration of the radio base station according to the one embodiment of the present invention.

FIG. 10 is a diagram illustrating one example of a function configuration of the radio base station according to the one embodiment of the present invention. In addition, this example mainly illustrates function blocks of characteristic portions according to the present embodiment, and assumes that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present invention.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal transmitted on the PDSCH), and a downlink control signal (e.g., a signal that is transmitted on the PDCCH and/or the EPDCCH and is, for example, transmission acknowledgement information). Furthermore, the control section 301 controls generation of a downlink control signal and a downlink data signal based on a result obtained by deciding whether or not it is necessary to perform retransmission control on an uplink data signal. Furthermore, the control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

Furthermore, the control section 301 controls scheduling of an uplink data signal (e.g., a signal transmitted on the PUSCH), an uplink control signal (e.g., a signal that is transmitted on the PUCCH and/or the PUSCH and is, for example, transmission acknowledgement information), a random access preamble (e.g., a signal transmitted on the PRACH) and an uplink reference signal.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present invention.

The transmission signal generating section 302 generates, for example, a DL assignment for notifying downlink signal allocation information, and/or a UL grant for notifying uplink signal allocation information based on the instruction from the control section 301. The DL assignment and the UL grant are both DCI, and conform to a DCI format. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on a given radio resource based on the instruction from the control section 301, and outputs the downlink signal to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmission/reception section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301.

Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ) or a Signal to Interference plus Noise Ratio (SINR)), a signal strength (e.g., a Received Signal Strength Indicator (RSSI)) or channel information (e.g., CSI). The measurement section 305 may output a measurement result to the control section 301.

Furthermore, the control section 301 may allocate radio resources for the sequence-based PUCCH. Furthermore, the control section 301 may allocate a sequence index for the sequence-based PUCCH.

<User Terminal>

Figure 11:
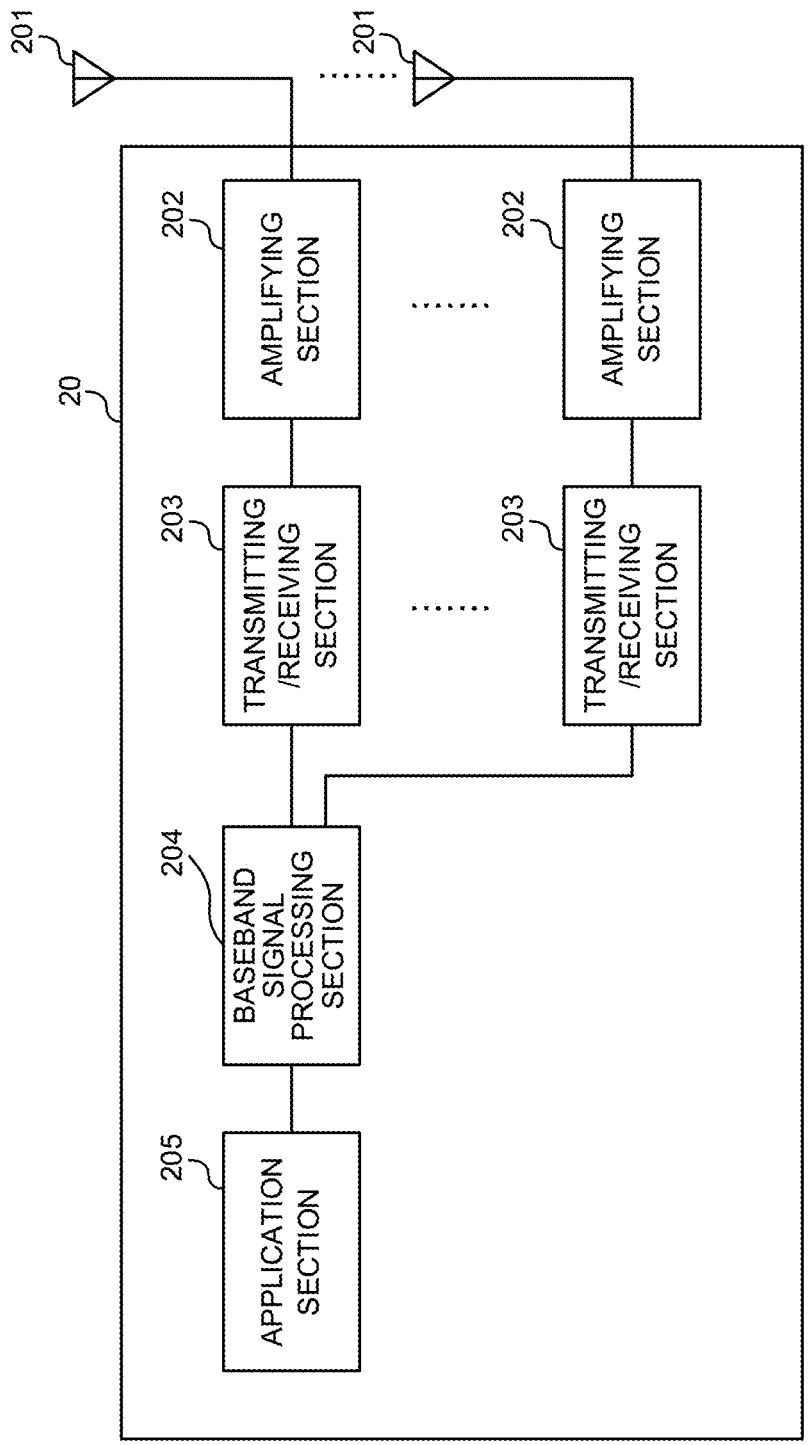
FIG. 11 is a diagram illustrating one example of an overall configuration of a user terminal according to the one embodiment of the present invention.

FIG. 11 is a diagram illustrating one example of an overall configuration of the user terminal according to the one embodiment of the present invention. The user terminal 20 includes pluralities of transmission/reception antennas 201, amplifying sections 202 and transmission/reception sections 203, a baseband signal processing section 204 and an application section 205. In this regard, the user terminal 20 only needs to be configured to include one or more of each of the transmission/reception antennas 201, the amplifying sections 202 and the transmission/reception sections 203.

Each amplifying section 202 amplifies a radio frequency signal received at each transmission/reception antenna 201. Each transmission/reception section 203 receives a downlink signal amplified by each amplifying section 202. Each transmission/reception section 203 performs frequency conversion on the received signal into a baseband signal, and outputs the baseband signal to the baseband signal processing section 204. The transmission/reception sections 203 can be composed of transmitters/receivers, transmission/reception circuits or transmission/reception apparatuses described based on the common knowledge in the technical field according to the present invention. In this regard, the transmission/reception sections 203 may be composed as an integrated transmission/reception section or may be composed of transmission sections and reception sections.

The baseband signal processing section 204 performs FFT processing, error correcting decoding, and reception processing of retransmission control on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information, too, among the downlink data to the application section 205.

On the other hand, the application section 205 inputs uplink user data to the baseband signal processing section 204. The baseband signal processing section 204 performs transmission processing of retransmission control (e.g., HARQ transmission processing), channel coding, precoding, Discrete Fourier Transform (DFT) processing and IFFT processing on the uplink user data, and transfers the uplink user data to each transmission/reception section 203. Each transmission/reception section 203 converts the baseband signal output from the baseband signal processing section 204 into a radio frequency band, and transmits a radio frequency signal. The radio frequency signal subjected to the frequency conversion by each transmission/reception section 203 is amplified by each amplifying section 202, and is transmitted from each transmission/reception antenna 201.

Furthermore, each transmission/reception section 203 may transmit a sequence (sequence-based PUCCH) by using a cyclic shift associated with a value of Uplink Control Information (UCI).

Furthermore, each transmission/reception section 203 may receive the parameter for the sequence-based PUCCH from the radio base station 10.

FIG. 12 is a diagram illustrating one example of a function configuration of the user terminal according to the one embodiment of the present invention. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains, from the received signal processing section 404, a downlink control signal and a downlink data signal transmitted from the radio base station 10. The control section 401 controls generation of an uplink control signal and/or an uplink data signal based on a result obtained by deciding whether or not it is necessary to perform retransmission control on the downlink control signal and/or the downlink data signal.

When obtaining from the received signal processing section 404 various pieces of information notified from the radio base station 10, the control section 401 may update the parameters used for control based on the pieces of information.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present invention.

The transmission signal generating section 402 generates an uplink control signal related to transmission acknowledgement information and Channel State Information (CSI) based on, for example, the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on a radio resource based on the instruction from the control section 401, and outputs the uplink signal to each transmission/reception section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmission/reception section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The received signal processing section 404 outputs information decoded by the reception processing to the control section 401. The received signal processing section 404 outputs, for example, broadcast information, system information, RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present invention.

For example, the measurement section 405 may perform RRM measurement or CSI measurement based on the received signal. The measurement section 405 may measure received power (e.g., RSRP), received quality (e.g., RSRQ or an SINR), a signal strength (e.g., RSSI) or channel information (e.g., CSI). The measurement section 405 may output a measurement result to the control section 401.

Furthermore, the control section 401 may control determination of a cyclic shift associated with a specific candidate value (e.g., ACK of one-bit UCI or ACK-ACK of two-bit UCI) among a plurality of candidate values (e.g., a value of one-bit or two-bit transmission acknowledgement information) of uplink control information based on parameters (e.g., at least one of a resource number (CS index) of the specific candidate value, a usable index interval X, a maximum UE multiplexing number M, a CS candidate set index S, information indicating whether or not to perform UE multiplexing and a CS candidate interval Y) notified from the radio base station. The control section 401 may control determination of cyclic shifts associated with other candidate values among a plurality of candidate values based on the determined cyclic shift.

Furthermore, the parameter may include a number of the cyclic shift associated with the specific candidate value.

Furthermore, a plurality of cyclic shifts associated respectively with a plurality of candidate values may be associated respectively with a plurality of phase rotation amounts obtained by dividing $2\pi$ by the number of a plurality of candidate values (K).

Furthermore, the parameter may include information indicating whether or not to perform code division multiplexing (e.g., UE multiplexing) on a sequence and a sequence transmitted from another user terminal.

Furthermore, a cyclic shift associated with a positive acknowledgement (e.g., ACK of one-bit UCI or ACK-ACK of two-bit UCI) of the user terminal 20 among a plurality of cyclic shifts may not be neighbor to a cyclic shift associated with a positive acknowledgement of another user terminal.

<Hardware Configuration>

In addition, the block diagrams used to describe the above embodiments illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 13:
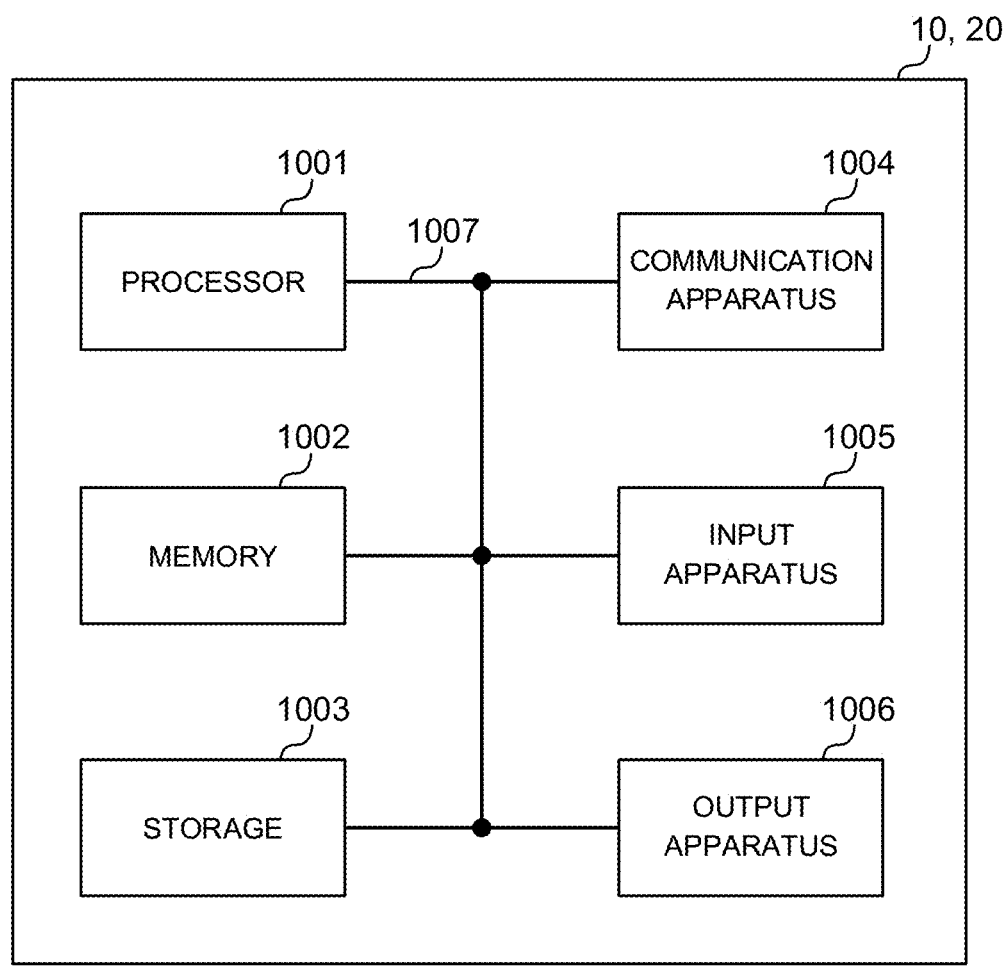
FIG. 13 is a diagram illustrating one example of hardware configurations of the radio base station and the user terminal according to the one embodiment of the present invention.

For example, the radio base station and the user terminal according to the one embodiment of the present invention may function as computers that perform processing of the radio communication method according to the present invention. FIG. 13 is a diagram illustrating one example of the hardware configurations of the radio base station and the user terminal according to the one embodiment of the present invention. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 13 or may be configured without including part of the apparatuses.

For example, FIG. 13 illustrates the only one processor 1001. However, there may be a plurality of processors. Furthermore, processing may be executed by one processor or may be executed by one or more processors concurrently, successively or by using another method. In addition, the processor 1001 may be implemented by one or more chips.

Each function of the radio base station 10 and the user terminal 20 is realized by, for example, causing hardware such as the processor 1001 and the memory 1002 to read given software (program), and thereby causing the processor 1001 to perform an operation, and control communication performed via the communication apparatus 1004 and control reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiments are used. For example, the control section 401 of the user terminal 20 may be realized by a control program stored in the memory 1002 and operating on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present invention.

The storage 1003 is a computer-readable recording medium and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via a wired and/or radio network, and is also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using buses that are different between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

Modified Example

In addition, each term that has been described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of periods (frames) in a time domain. Each of one or a plurality of periods (frames) that composes a radio frame may be referred to as a subframe. Furthermore, the subframe may include one or a plurality of slots in the time domain. The subframe may be a fixed duration (e.g., one ms) that does not depend on the numerologies.

Furthermore, the slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerologies. Furthermore, the slot may include a plurality of mini slots. Each mini slot may include one or a plurality of symbols in the time domain. Furthermore, the mini slot may be referred to as a subslot.

The radio frame, the subframe, the slot, the mini slot and the symbol each indicate a time unit for transmitting signals. The other corresponding names may be used for the radio frame, the subframe, the slot, the mini slot and the symbol. For example, one subframe may be referred to as a Transmission Time Interval (TTI), a plurality of contiguous subframes may be referred to as TTIs, or one slot or one mini slot may be referred to as a TTI. That is, the subframe and/or the TTI may be a subframe (one ms) according to legacy LTE, may be a period (e.g., 1 to 13 symbols) shorter than one ms or may be a period longer than one ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this.

The TTI may be a transmission time unit of a channel-coded data packet (transport block), a code block and/or a codeword, or may be a processing unit of scheduling or link adaptation. In addition, when the TTI is given, a time interval (e.g., the number of symbols) in which a transport block, a code block and/or a codeword are actually mapped may be shorter than the TTI.

In addition, when one slot or one mini slot is referred to as a TTI, one or more TTIs (i.e., one or more slots or one or more mini slots) may be a minimum time unit of scheduling. Furthermore, the number of slots (the number of mini slots) that compose a minimum time unit of the scheduling may be controlled.

The TTI having the duration of one ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a duration exceeding one ms, and the short TTI (e.g., the reduced TTI) may be read as a TTI having a TTI length less than the TTI length of the long TTI and equal to or more than one ms.

Resource Blocks (RBs) are resource allocation units of the time domain and the frequency domain, and may include one or a plurality of contiguous subcarriers in the frequency domain. Furthermore, the RB may include one or a plurality of symbols in the time domain or may have the length of one slot, one mini slot, one subframe or one TTI. One TTI or one subframe may be each composed of one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may be composed of one or a plurality of Resource Elements (REs). For example, one RE may be a radio resource domain of one subcarrier and one symbol.

In this regard, structures of the above radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are by no means restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are by no means restrictive ones.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The input and output information and signals can be overwritten, updated or additionally written. The output information and signals may be deleted. The input information and signals may be transmitted to other apparatuses.

Notification of information is not limited to the aspects/embodiments described in this description and may be performed by other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIBs) and System Information Blocks (SIBs)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") may be made not only explicitly but also implicitly (by, for example, not notifying this given information or by notifying another information).

Decision may be made based on a value (0 or 1) expressed by one bit, may be made based on a boolean expressed by true or false or may be made by comparing numerical values (e.g., comparison with a given value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station is also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used. The base station is also referred to as a term such as a fixed station, a NodeB, an eNodeB (eNB), an access point, a transmission point, a reception point, a femtocell or a small cell in some cases.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and "downlink" may be read as "sides". For example, the uplink channel may be read as a side channel.

Similarly, the user terminal in this description may be read as the radio base station. In this case, the radio base station 10 may be configured to include the functions of the above user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" "calculating", "computing", "processing", "deriving", "investigating", "looking up" (e.g., looking up in a table, a database or another data structure) and "ascertaining". Furthermore, "deciding (determining)" may be regarded to "decide (determine)" "receiving" (e.g., receiving information), "transmitting" (e.g., transmitting information), "input", "output" and "accessing" (e.g., accessing data in a memory). Furthermore, "deciding (determining)" may be regarded to "decide (determine)" "resolving", "selecting", "choosing", "establishing" and "comparing". That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of physical and logical connections. For example, "connection" may be read as "access".

It can be understood that, when the two elements are connected in this description, the two elements are "connected" or "coupled" with each other by using one or more electric wires, cables and/or printed electrical connection, and by using electromagnetic energy having wavelengths in radio frequency domains, microwave domains and/or (both of visible and invisible) light domains in some non-restrictive and incomprehensive examples.

A sentence that "A and B are different" in this description may mean that "A and B are different from each other". Words such as "separate" and "coupled" may be interpreted in a similar manner.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above. However, it is obvious for a person skilled in the art that the present invention is not limited to the embodiments described in this description. The present invention can be carried out as modified and changed aspects without departing from the gist and the scope of the present invention defined based on the recitation of the claims. Accordingly, the disclosure of this description intends for exemplary explanation, and does not have any restrictive meaning to the present invention.

The invention claimed is:

1. A terminal comprising:
a receiver that receives a cyclic shift index;
a processor that determines a cyclic shift based on addition of an integer value associated with a Hybrid Automatic Repeat reQuest-Acknowledgement (HARQ-ACK) to the cyclic shift index, and generates a sequence based on the cyclic shift; and
a transmitter that transmits the sequence on an uplink control channel,
wherein:
when the HARQ-ACK is a 1-bit NACK, the integer value is 0,
when the HARQ-ACK is a 1-bit ACK, the integer value is 6,
when the HARQ-ACK is a 2-bit NACK-NACK, integer value is 0,
when the HARQ-ACK is a 2-bit NACK-ACK, the integer value is 3,
when the HARQ-ACK is a 2-bit ACK-ACK, the integer value is 6, and
when the HARQ-ACK is a 2-bit ACK-NACK, the integer value is 9.

2. The terminal according to claim 1 wherein the processor determines the index based on at least one of higher layer signaling and a downlink control information.

3. A radio communication method for a terminal, the method comprising:
receiving a cyclic shift index;
determining a cyclic shift based on addition of an integer value associated with a Hybrid Automatic Repeat reQuest-Acknowledgement (HARQ-ACK) to the cyclic shift index, and generating a sequence based on the cyclic shift; and
transmitting the sequence on an uplink control channel,
wherein:
when the HARQ-ACK is a 1-bit NACK, the integer value is 0, cyclic shift is calculated based on an index and
when the HARQ-ACK is a 1-bit ACK, the integer value is 6,
when the HARQ-ACK is a 2-bit NACK-NACK, integer value is 0,
when the HARQ-ACK is a 2-bit NACK-ACK, the integer value is 3,
when the HARQ-ACK is a 2-bit ACK-ACK, the integer value is 6, and
when the HARQ-ACK is a 2-bit ACK-NACK, the integer value is 9.

4. A system comprising:
a terminal that comprises:
a receiver that receives a cyclic shift index;
a processor that determines a cyclic shift based on addition of an integer value associated with a Hybrid Automatic Repeat reQuest-Acknowledgement (HARQ-ACK) to the cyclic shift index, and generate a sequence based on the cyclic shift; and
a transmitter that transmits the sequence on an uplink control channel; and
a base station that receives the sequence on the uplink control channel,
wherein:
when the HARQ-ACK is a 1-bit NACK, the integer value is 0,
when the HARQ-ACK is a 1-bit ACK, the integer value is 6,
when the HARQ-ACK is a 2-bit NACK-NACK, integer value is 0,
when the HARQ-ACK is a 2-bit NACK-ACK, the integer value is 3,
when the HARQ-ACK is a 2-bit ACK-ACK, the integer value is 6, and
when the HARQ-ACK is a 2-bit ACK-NACK, the integer value is 9.

* * * * *